(12) United States Patent
Yoshida et al.

(10) Patent No.: US 6,397,817 B1
(45) Date of Patent: Jun. 4, 2002

(54) CONTROL SYSTEM FOR IN-CYLINDER INJECTION TYPE ENGINE

(75) Inventors: Yoshiyuki Yoshida; Toshio Hori, both of Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/658,157

(22) Filed: Sep. 8, 2000

(30) Foreign Application Priority Data

Sep. 20, 1999 (JP) .............................. 11-266244

(51) Int. Cl.[7] .................................................. F02P 5/00
(52) U.S. Cl. .................................. 123/406.047; 123/435
(58) Field of Search ............................ 123/406.47, 435, 123/436, 406.26

(56) References Cited

U.S. PATENT DOCUMENTS

| | | | | |
|---|---|---|---|---|
| 4,716,873 A | * | 1/1988 | Takaba et al. ......... | 123/406.47 |
| 4,941,445 A | * | 7/1990 | Deutsch .................. | 123/406.47 |
| 5,101,787 A | * | 4/1992 | Kako ..................... | 123/406.47 |
| 5,190,008 A | * | 3/1993 | Yamasaki et al. ....... | 123/406.47 |
| 5,875,756 A | * | 3/1999 | Kamura et al. ......... | 123/406.47 |
| 5,975,047 A | * | 11/1999 | Kamura et al. ......... | 123/406.47 |

FOREIGN PATENT DOCUMENTS

JP    11-30177    7/1997

* cited by examiner

Primary Examiner—John Kwon
(74) Attorney, Agent, or Firm—McDermott, Will & Emery

(57) ABSTRACT

Ignition timing changing control is performed in an engine operated under a condition of injecting fuel in the compression stroke. When ignition timing is changed in the engine operated under a condition of injecting fuel in the compression stroke, the fuel injection timing is changed corresponding to engine rotating speed and fuel supply pressure.

5 Claims, 12 Drawing Sheets

CONTROL SYSTEM FOR IN-CYLINDER INJECTION TYPE ENGINE

BACKGROUND OF THE INVENTION

The present invention relates to a control system for an in-cylinder injection type engine and, more particularly, a control system for an in-cylinder injection type engine in which fuel injection and ignition are performed in the compression stroke.

For example, Japanese Patent Application Laid-Open No.11-30177 proposes a method of controlling fuel injection and ignition of an in-cylinder injection type engine in which the fuel injection timing in the compression stroke is modified corresponding to an ignition timing modification amount in order to prevent deterioration of combustion when ignition timing operation is performed for torque operation during stratified burning.

However, the patent does not proposes any detailed modification method (means) in this engine control system in regard to the method of modifying ignition timing corresponding to an ignition timing modification.

SUMMARY OF THE INVENTION

An object of the present invention is to propose a detailed control means which is capable of controlling fuel injection timing control in order to maintain a good combustion condition when the injection timing is changed in an in-cylinder injection type engine in which fuel injection and ignition are performed during the compression stroke.

The present invention realizes a control system for an in-cylinder injection type engine comprising a means for injecting fuel into a cylinder of the engine in a compression stroke; a means for igniting the fuel in the compression stroke; a means for determining fuel injection timing and ignition timing from conditions of a rotating speed and a load of the engine; a means for modifying ignition timing from conditions other than the conditions of the rotating speed and the load of the engine; and a means for modifying fuel injection timing, wherein the means for modifying fuel injection timing modifies the fuel injection timing corresponding to the rotating speed of the engine so as to adapt to change of behavior inside a combustion chamber caused by the modification of the ignition timing.

In more detail, the modified value of fuel injection timing is calculated based on the modified value of ignition timing and the rotating speed of the engine.

Further, the modified value of fuel injection timing is calculated based on the modified value of ignition timing and the rotating speed of the engine and a fuel supply pressure.

Further, the means for modifying ignition timing has an allowable limit value for an amount to be changed.

Furthermore, the means for modifying fuel injection timing has an allowable limit value for an amount to be changed.

DESCRIPTION OF THE PREFERRED EMBODIMENTS

An embodiment of a control system for an in-cylinder injection type engine in accordance with the present invention will be described below, referring to drawings.

Figure 1:
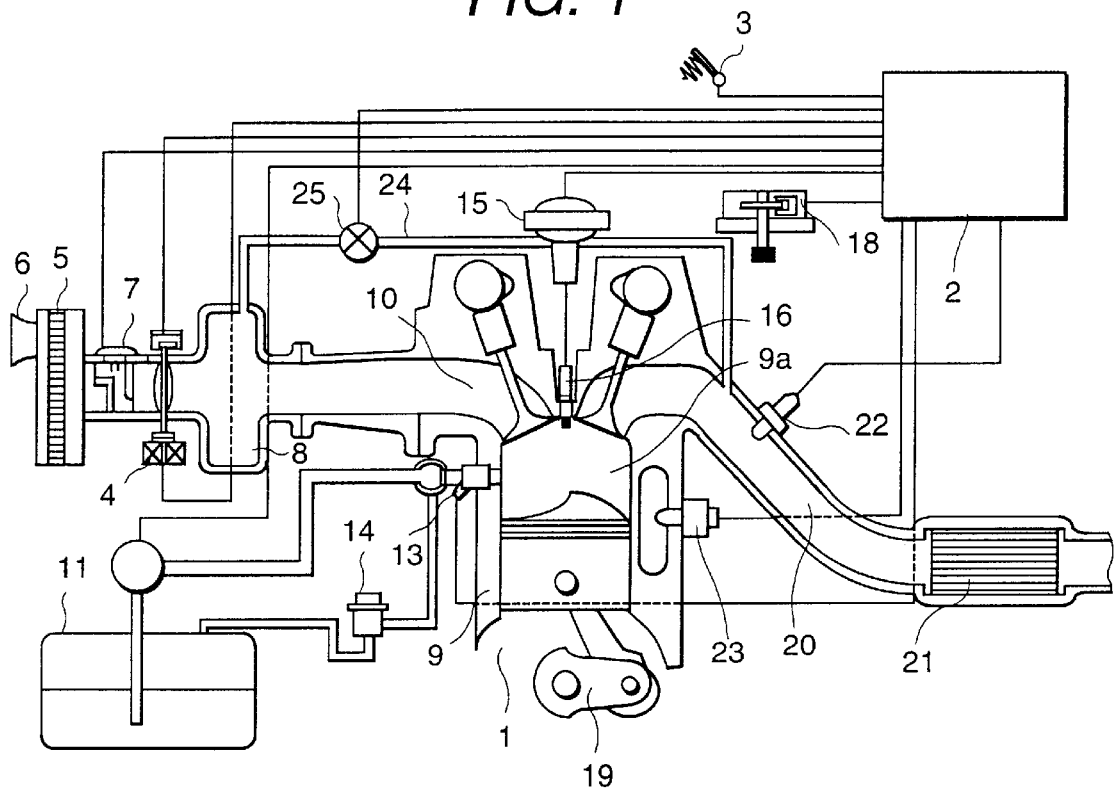
FIG. 1 is a schematic diagram showing an embodiment of an in-cylinder injection type engine system in accordance with the present invention.

FIG. 1 is a schematic diagram showing the embodiment of the in-cylinder injection type engine system in accordance with the present invention.

An amount of air taken in an engine 1 is controlled by controlling an electronic control throttle valve unit (ETC) 4 using an engine control unit 2 based on an acceleration pedal operated amount signal from an acceleration pedal sensor 3. The air to be taken in the engine 1 is taken from an inlet portion 6 of an air cleaner 5, and enters in a collector 8 through an air flow meter 7 of means for measuring a flow rate of the intake air. The air taken in the collector 8 is distributed to each of intake pipes 10 connected to each of cylinders 9 of the engine 1 and sucked in a combustion chamber 9a in each of the cylinders 9 (inside cylinder).

On the other hand, fuel such as gasoline is sucked from a fuel tank 11 and pressurized using a fuel pump 12 to be supplied to a fuel system having injectors 13. The pressurized fuel is regulated to a constant fuel pressure (for example, 5 MPa) using a fuel pressure regulator 14 to be injected inside the cylinder 9 from the injector 13 provided in each of the cylinders 9. The fuel injected into the cylinder 9 is ignited by generating a spark in a spark plug 16 using an ignition voltage boosted by an ignition coil 15.

The control unit 2 receives an acceleration pedal stepping-in amount signal from the acceleration pedal operated amount sensor 3, a signal indicating an intake air flow rate from the air flow meter 7, an angle signal POS of a crank shaft 19 from a crank angle sensor 18, an exhaust gas air-fuel ratio detected signal from an A/F sensor 22 arranged before a catalyst type exhaust gas cleaning unit 21 in an exhaust gas pipe 20, and a water temperature detected signal from an engine cooling water sensor 23.

The intake air flow rate signal detected by the air flow meter 7 is calculated and converted to an intake air amount by performing a processing such as filter processing means, and then the intake air amount is divided by an engine rotating speed (rotating speed) and multiplied by such a coefficient k that the air-fuel ratio becomes stoichiometric (A/F=14.7 stoichiometric ratio) to obtain a basic fuel injecting pulse width per one-cylinder, that is, a basic fuel injecting amount. After that, a fuel injection amount is calculated by performing various kinds of fuel amount modifications corresponding to operating conditions of the engine based on the basic fuel injecting amount, and then the fuel is supplied to each of the cylinders 9 by operating the injector 13.

Further, when a desired air-fuel ratio is required, the control unit 2 detects an actual air-fuel ratio of the exhaust gas from the air-fuel ratio detected signal output from the A/F sensor 22 arranged in the exhaust gas pipe 20 and performs closed loop control in which the amount of supplied fuel is adjusted using the detected signal of the A/F sensor. By doing so, the desired air-fuel ratio can be obtained.

Furthermore, the control unit 2 performs exhaust gas re-circulation control by controlling an exhaust gas re-circulation control valve 25 arranged in an exhaust gas re-circulation (EGR) path 24.

The control unit 2 and the sensors connected to the control unit and actuators will be described below, referring to FIG. 2.

Electric signals from the sensors are input to a calculating means 100 in the control unit 2. The calculating means 100 recognizes conditions of the engine and the surroundings from these signals, and performs appropriate calculation processing corresponding to the recognized conditions to output command signals for driving the actuators.

Figure 2:
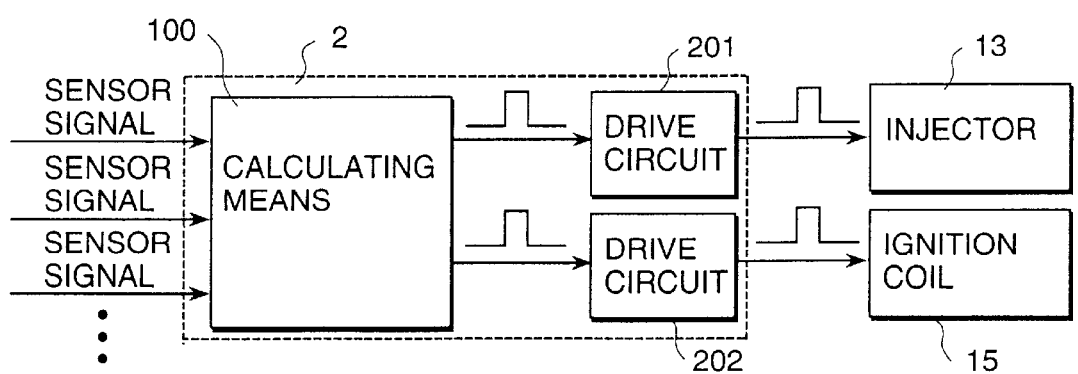
FIG. 2 is a block diagram showing the relationship among a control unit, sensors and actuators (an injector and an ignition coil) in the in-cylinder injection type engine system shown in FIG. 1.

As a typical example, FIG. 2 shows command signals and drive signals to the injector 13 and the ignition coil 15. Each of the signals to the injector 13 or the ignition coil 15 is an electric signal changing to a high level and a low level, and is amplified to the drive signal having electric energy enough to drive the actuator by each drive circuit 201 or 202 to be supplied to the injector 13 or the ignition coil 15.

The injector 13 opens a fuel passage switching part to inject fuel by conducting current to an inner coil during the high level period of the command signal. Since a fuel injection flow rate per unit time is determined by a fuel pressure upstream of the fuel passage switching part, the control of fuel injection amount is performed by controlling the valve opening time of the injector 13.

The ignition coil 15 ignites a mixed gas inside the cylinder by conducting current to an inner primary side coil during the high level period of the command signal to generate a high induction voltage for generating discharge in the spark plug.

Figure 3:
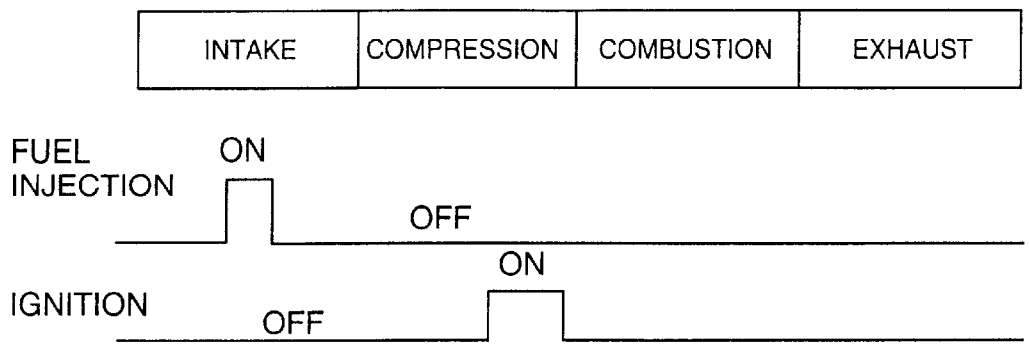
FIG. 3 is a chart showing timings when fuel injection is performed during the intake stroke.
Figure 4:
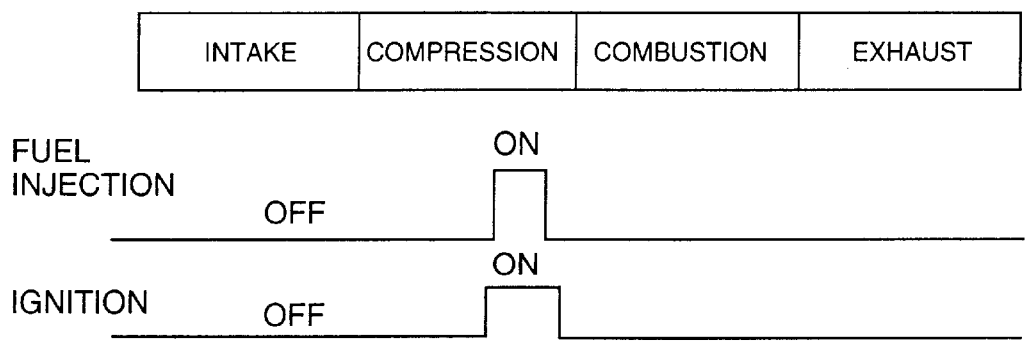
FIG. 4 is a chart showing timings when fuel injection is performed during the compression stroke.

Since the fuel supply into the cylinder 9 is performed by directly injecting the fuel from the injector 13 into the cylinder 9, the injecting period of the fuel to be used for combustion is limited to the intake stroke or the compression stroke. FIG. 3 shows an example of timings when the fuel injection is performed during the intake stroke, and FIG. 4 shows an example of timings when the fuel injection is performed during the compression stroke. In each of the both cases, the ignition timing is in the latter-half of the compression stroke in which the mixed gas is compressed and easily ignited. There is a difference between the fuel injection during the intake stroke and the fuel injection during the compression stroke and each has a merit and demerit, as to be described later. Therefore, it is efficient to selectively use the both in operation of the engine depending on the operating condition of the engine.

Figure 5:
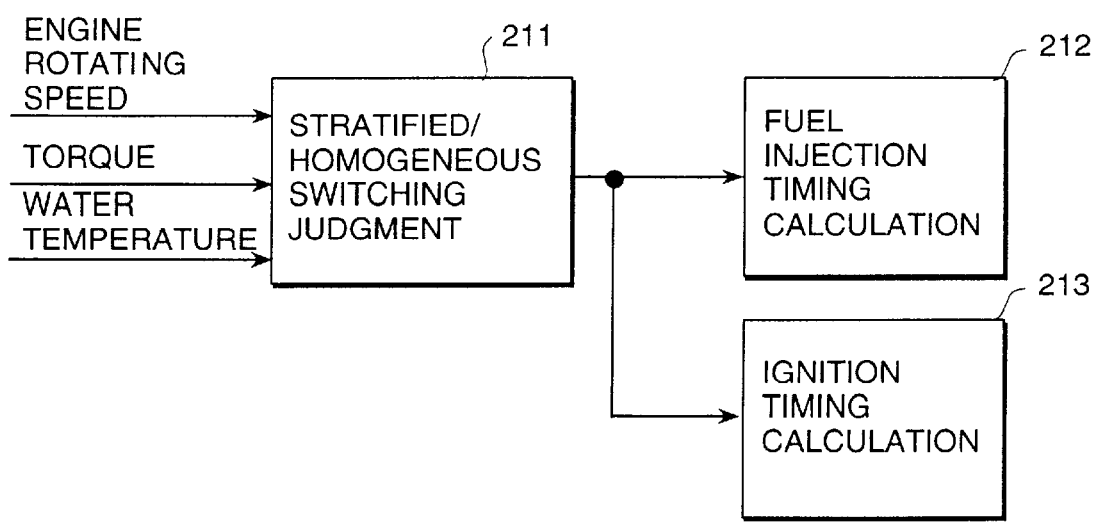
FIG. 5 is a block diagram showing a control means for selectively using between intake stroke fuel injection and compression stroke fuel injection.

An example of control of selectively using between the intake stroke fuel injection and the compression stroke fuel injection will be described below, referring to FIG. 5. The control of selectively using between them is executed by calculation processing in the calculating means 100 of the control unit 2. In the block 211, from the number of rotations (rotating speed) of the engine, the torque to be output from the engine obtained corresponding to an acceleration pedal operated amount and the rotating speed of the engine and operating conditions of the engine such as the cooling temperature of the engine, it is judged. which is to be performed, the stratified burning or the homogeneous burning. The stratified burning and the homogeneous burning mean a degree of dispersion of the mixed gas inside the combustion chamber, as to be described later, and can be controlled by the fuel injection timing. The judgment which is to be performed, the stratified burning or the homogeneous burning, can be made more detailed by appropriately inputting information suitable for selectively using between the both in addition to the signals described in the figure.

The judged result which is to be performed, the stratified burning or the homogeneous burning, is transmitted to each of the block 212 and the block 213. A fuel injection timing suitable for performing the stratified burning or the homogeneous burning id calculated in the block 212, and an ignition timing suitable for performing the stratified burning or the homogeneous burning id calculated in the block 213.

Figure 6:
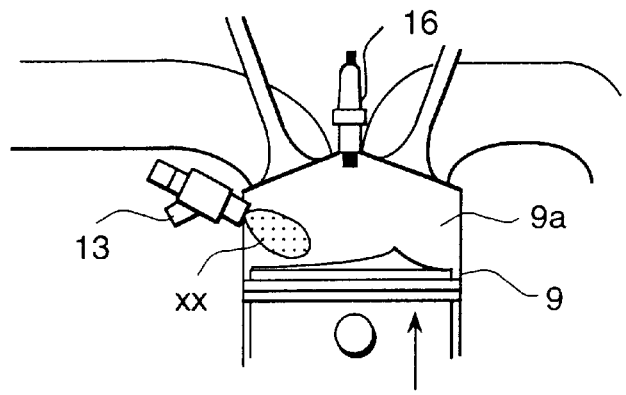
FIG. 6 is a schematic view showing behavior in stratified burning operation in which combustion is performed by injecting fuel during compression stroke.
Figure 6:
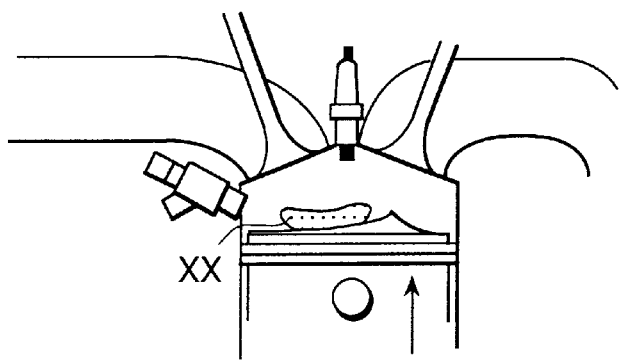
Figure 6:
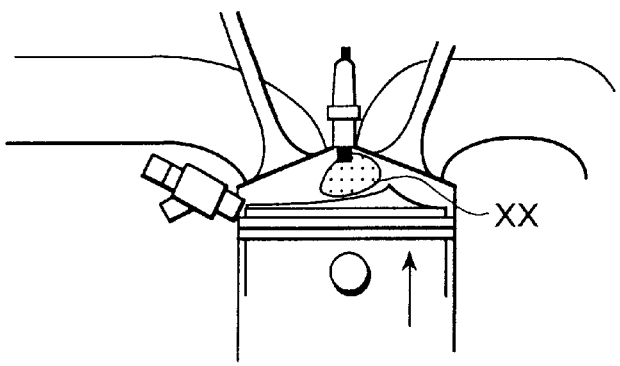

Description will be made below on the behavior of the stratified burning by injecting fuel during the compression stroke in such an engine, referring to FIG. 6. FIGS. 6 (A), (B), (C) show states inside the combustion chamber 9a during the compression stroke in time sequence. The FIG. (A) shows the state that the fuel xx is completed to be injected from the injector 13 into the cylinder 9. When the state becomes as shown in the figure (B), the piston is moved up higher compared to at the time point of (A), and the fuel xx reaches the upper surface of the piston. The piston has a depressed portion by which the fuel is prevented from diffusing and is transported upward. Therefore, when the state becomes as shown in the figure (C), the fuel xx gathers around the spark plug 16 with appropriately mixing with air. When ignition is made at this time point, the mixed gas of an appropriate air-fuel ratio around the spark plug 16 can be ignited, and accordingly good combustion can be performed.

At that time, since the fuel xx does not exist inside the combustion chamber 9a except for the space near the spark plug 16, the air-fuel ratio in the whole combustion chamber is in an extreme lean state. Such combustion can obtain better fuel economy compared to the homogeneous burning in which the mixed gas in a homogeneous state is burned because the pumping loss of the engine can be reduced.

On the other hand, in the homogeneous burning in which fuel injection is performed during the intake stroke though illustrative explanation will be omitted here, air is sucked from the intake valve as the piston is moved downward, and the fuel injected in this intake stroke is conveyed by the intake air and homogeneously dispersed inside the combustion chamber. After that, the state is changed to the compression stroke, and the mixed gas is compressed in a homogeneously mixed form and ignited. In this case, good combustion can be obtained by setting the air-fuel ratio to a richer state compared to the case of the fuel injection during compression stroke described above.

As described above, the mixed gas inside the combustion chamber can be stratified by injecting the fuel during the compression stroke to be burned, and as the result, good combustion can be obtained. However, it can be understood that the fuel injection timing and the ignition timing are necessary to be controlled with a closed relationship between each other in order to hold the stratified burning.

Figure 7:
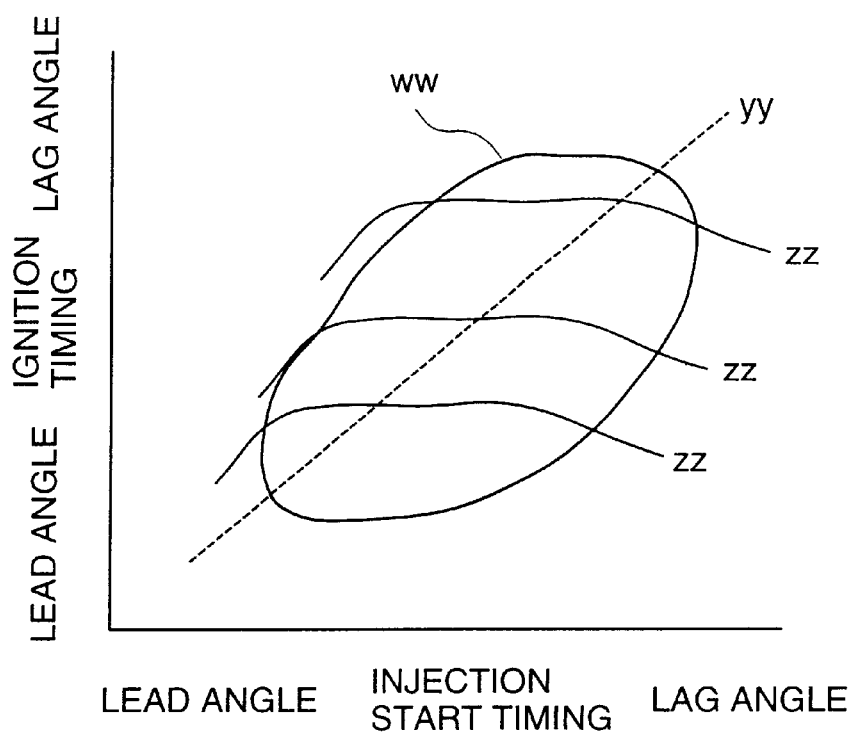
FIG. 7 is a graph showing an example of the characteristic of engine performance depending on fuel injection start timing and ignition timing when the engine is operated under the condition of compression stroke fuel injection.

FIG. 7 is a graph showing an example of the characteristic of engine performance depending on the fuel injection start timing and the ignition timing when the engine is operated under the condition of compression stroke fuel injection. A closed curve ww in the figure indicates a zone where the combustion is stable, and it means that the combustion is stable inside the closed curve and the combustion is unstable outside the closed curve. A straight line yy shown by a broken line approximately indicates the middle line of the zone where the combustion is stable, and the straight line shows that good combustion can be obtained under conditions that both of the fuel injection start timing and the ignition timing has a lead angle or a lag angle with an appropriate relationship. According to this characteristic, it can be understood that good combustion can be obtained by starting the fuel injection at the timing in prior to ignition so that the fuel is transported to a position near the spark plug at the ignition timing, and that when the ignition timing is shifted toward the lead angle side, the angle of fuel injection start timing is also shifted toward the lead angle side, and that when the ignition timing is shifted toward the lag angle side, the angle of fuel injection start timing is also shifted toward the lag angle side.

On the other hand, each of the curves zz indicates a contour line of exhaust gas temperature at each ignition timing and each injection start timing, and the exhaust gas temperature is low when the ignition timing is in the lead angle side and the exhaust gas temperature is high when the ignition timing is in the lag angle side. In the unstable zone of combustion, the exhaust gas temperature is low because heat itself generated by combustion is less. In general, when the ignition timing is shifted toward the lead angle side, the exhaust gas temperature becomes high because combustion under a high compression ratio at near TDC (top dead center of the piston) is not perfectly completed and the combustion is continued until the exhaust stroke. This phenomenon occurs not only at compression stroke injection (stratified burning) but also at burning of homogeneous mixed gas (homogeneous burning).

Figure 8:
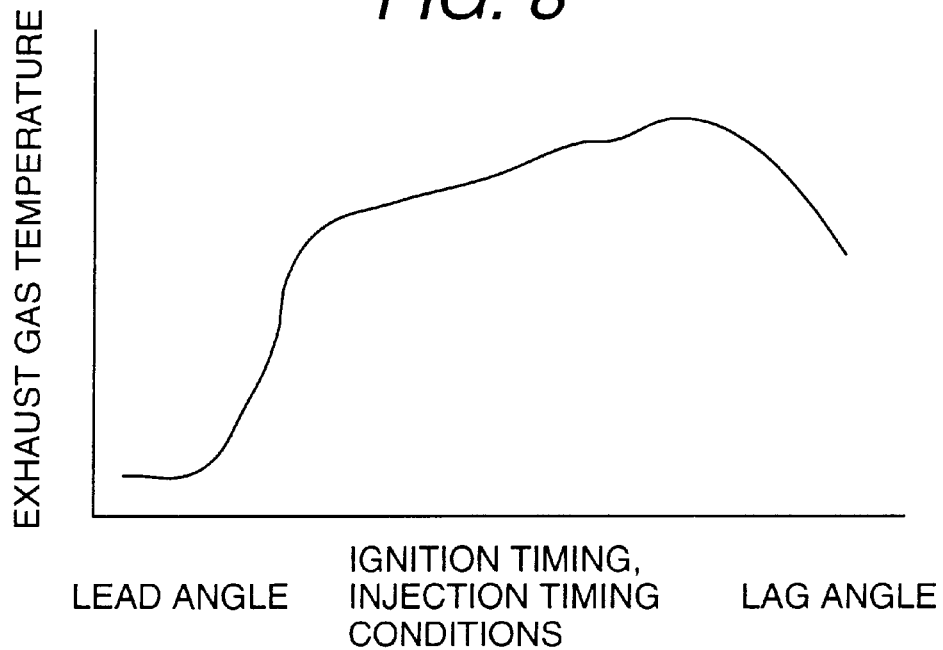
FIG. 8 is a graph showing the relationship between ignition timing, fuel injection timing and exhaust gas temperature when the engine is operated under the condition of compression stroke fuel injection.

FIG. 8 shows an example of a distribution of exhaust gas temperature under a condition on the straight line yy of FIG. 7. As the both conditions of the ignition timing and the fuel injection timing are being shifted from the lead angle side to the lag angle side, the exhaust gas temperature initially becomes high in the condition that good combustion can be obtained, and then the exhaust gas temperature monotonously increases with increasing of the lag angle, and the exhaust gas temperature decreases in the condition that good combustion can not be obtained.

Figure 9:
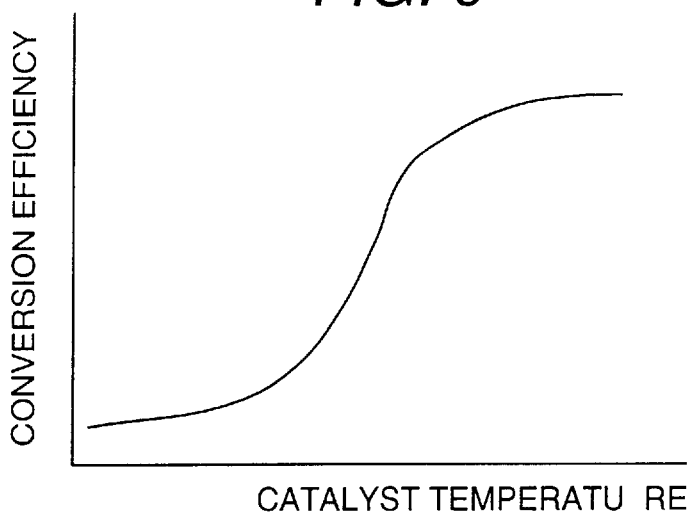
FIG. 9 is a graph showing the relationship between catalyst temperature and conversion efficiency (oxidation and reduction capacity).

On the other hand, temperature of the catalyst of the exhaust gas cleaning unit 21 is equal to temperature of the surround environment during stopping operation of the engine, and is increased after starting operation of the engine by heat of the exhaust gas. Further, the catalyst has a function to exhaust the reducers and the oxidizers in the exhaust gas by oxidizing and reducing them, respectively. The power of oxidation and reduction shows a high value when the temperature of the catalyst is above a certain value, as shown by FIG. 9. Therefore, when the temperature of the catalyst is low at the time just after starting operation of the engine, the catalyst can be earlier activated by increasing the temperature of the exhaust gas to accelerate the temperature rise of the catalyst.

In a case of the stratified burning in which the fuel is injected in the compression stroke, a method of increasing the temperature of the exhaust gas can be attained by operating the engine under the ignition timing and the fuel injection timing in the lag angle side, as described referring to FIG. 7.

Figure 10:
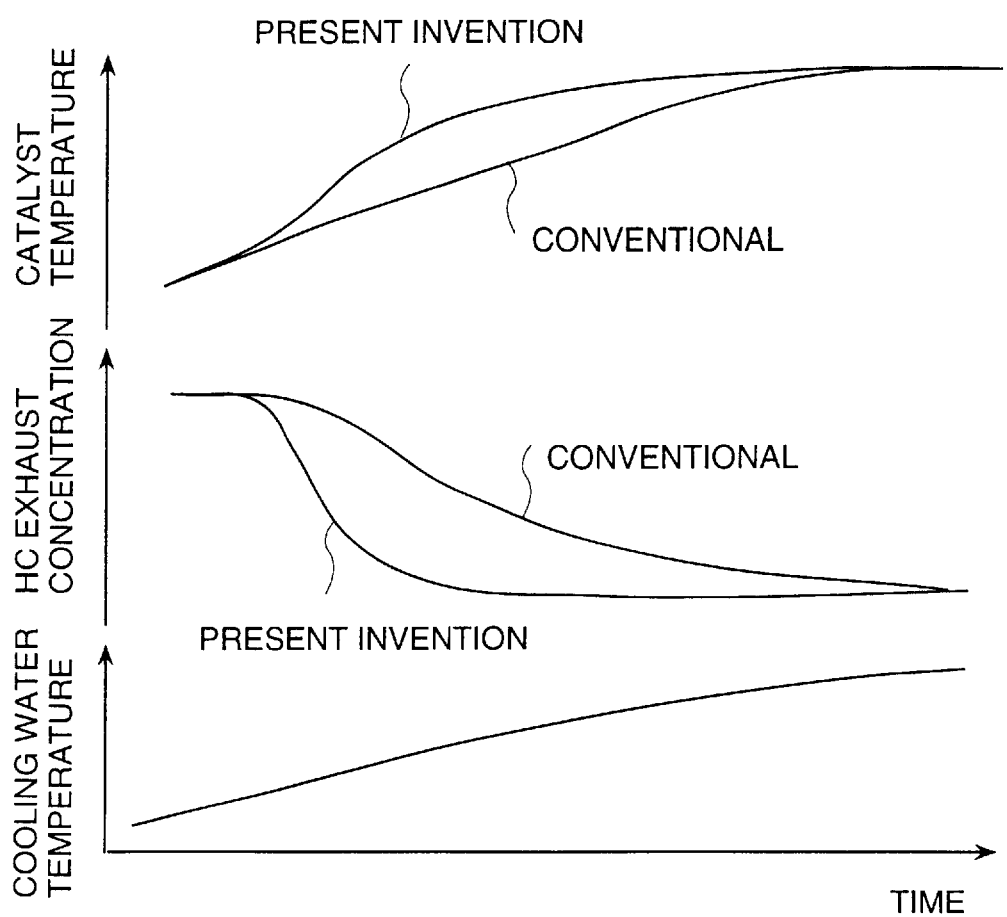
FIG. 10 is a graph showing an example of changes with time in catalyst temperature, HC emission concentration and engine cooling water temperature after starting operation of an engine under stratified burning operation.

FIG. 10 is a graph showing an example of changes with time in catalyst temperature, HC emission concentration and engine cooling water temperature after starting operation of the engine under stratified burning operation. It can be understood that by operating the engine with shifting the ignition timing toward the lag angle side, the temperature of the catalyst is increased earlier, and as a result, the exhaust concentration of HC of a reducer earlier becomes a low value.

The control of the ignition timing and the fuel injection timing necessary for performing such combustion can be realized by selecting an ignition timing and a fuel injection timing on the straight line yy described referring to FIG. 7. In other words, in a case where the ignition timing is requested to be shifted toward the lag angle side as in the time when the catalyst temperature is increased, the ignition timing can be shifted toward the lag angle side without deviating from the operating condition of stable combustion by shifting the ignition timing toward the lag angle side and at the same time by setting a fuel injection timing obtained from the relationship of the straight line yy. Therefore, the temperature of the catalyst can be increased without deteriorating the combustion condition. Further, when the catalyst temperature reaches the target temperature, it is preferable that the ignition timing is shifted toward the lead angle side because there is no need to keep the ignition timing in the lag angle. In that case, the ignition timing can be shifted toward the lead angle side without deviating from the operating condition of stable combustion by setting a fuel injection timing obtained from the relationship of the straight line yy.

Figure 11:
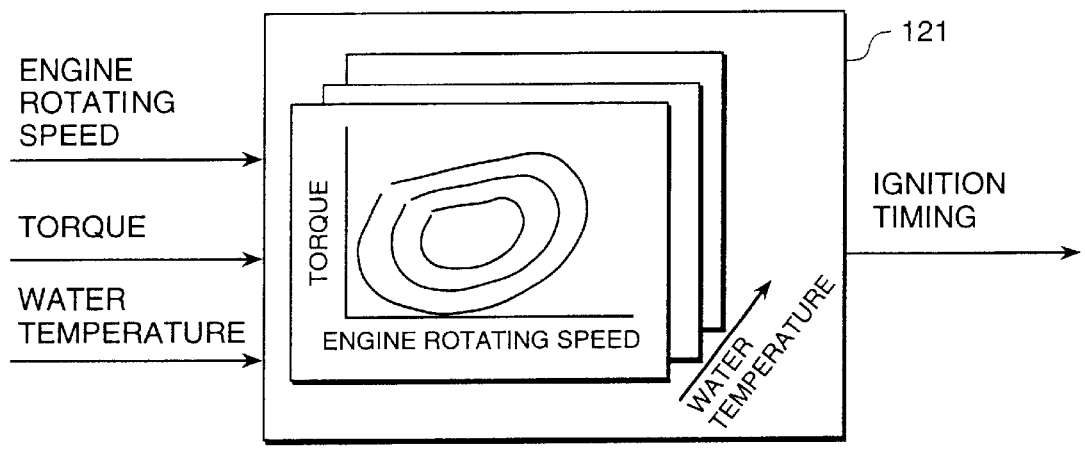
FIG. 11 is a block diagram of an embodiment of calculation processes of ignition timing control and fuel injection timing control which are executed by a calculating means of the control unit in the in-cylinder injection type engine system shown in FIG. 1.
Figure 11:
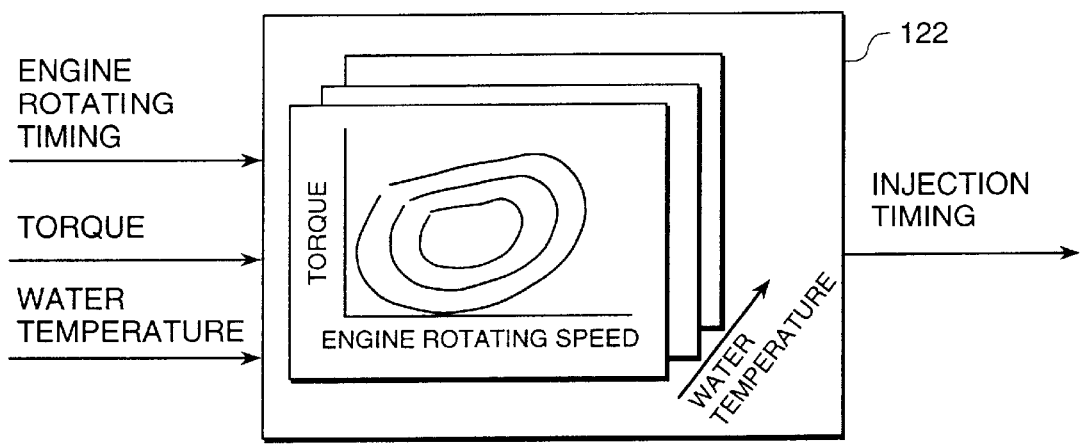

FIG. 11 shows an embodiment of the control described above. The control is also executed by the calculation processing in the calculation means 100 of the control unit 2. In each of the blocks 121 and 122, a map composed of three axes of engine rotating speed, torque and cooling water temperature is searched based on the same parameters. Therein, the parameters contained in the maps are ignition timing in the block 121 and fuel injection timing in the block 122. Numerical values of the parameters contained in the maps are set so that the ignition timing and the fuel injection timing are matched with the relationship shown in FIG. 7 at each lattice point of the three axes in advance. Since the parameters referred to in the blocks 121 and 122 are the same, a pair of matched values for the ignition timing and the fuel injection timing are searched regardless of the condition of the parameters. Further, the values contained in the maps are set to values in the lag side for both of the ignition timing and the injection timing when the cooling water temperature is low and to values in the lead side when the cooling water temperature is high. By doing so, an ignition timing and an injection timing capable of increasing the exhaust gas temperature can be selected when the cooling water temperature is low (when the catalyst temperature is low at the time just after starting operation of the engine and the catalyst temperature is required to be increased), and an ignition timing and an injection timing not increasing the exhaust gas temperature can be set when the cooling water temperature becomes high (when the catalyst temperature is unnecessary to be increased).

In a case where the angle of ignition timing is not requested to be shifted toward the lag angle side, there is no need to input the cooling water temperature into both of the blocks 121 and 122, and good combustion can be obtained by calculating an ignition timing and a fuel injection timing using the engine rotating speed and the torque. However, by adding the cooling water temperature to the determining factor of the ignition timing and the fuel injection timing, the exhaust gas temperature control described above can be performed.

Figure 12:
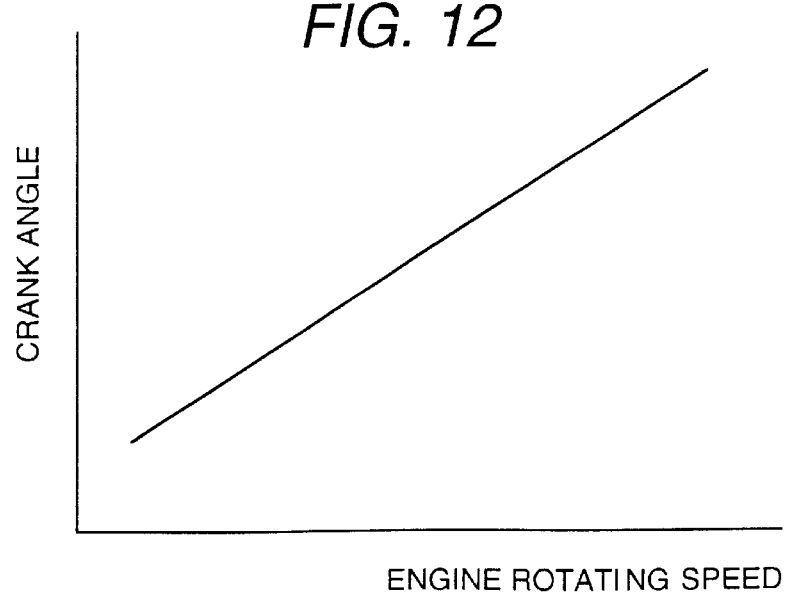
FIG. 12 is a graph showing the relationship between engine rotating speed and crank angle which is required for transporting injected fuel to a desired position.

The time from injecting fuel to igniting will be described below in more detail. The time required for the fuel xx reaching at the position shown by FIG. 6(B) is determined by the speed of injected fuel. Assuming that the injecting speed the fuel is constant, the time required for the fuel xx reaching at the position shown in the figure is constant. Since it is preferable that the fuel injection timing is controlled based on the crank angle in order to match with the ignition timing, the fuel injection timing needs a larger crank angle as the engine rotating speed is increased as shown by FIG. 12 when the fuel injection timing is expressed by the crank angle.

On the other hand, the crank angle required for changing from the state of FIG. 6(B) to the state of (C) is the time required for moving up the fuel xx by the piston. Therefore, the crank angle required for changing from the state of (B) to the state of (C) is somewhat sensitive to (affected by) the engine rotating speed, and requires a large crank angle when the engine rotating speed is low.

In other words, when fuel injection is performed in prior to an ignition timing, good combustion can be obtained by starting fuel injection in advance by the crank angle determined mainly by the engine rotating speed.

Figure 13:
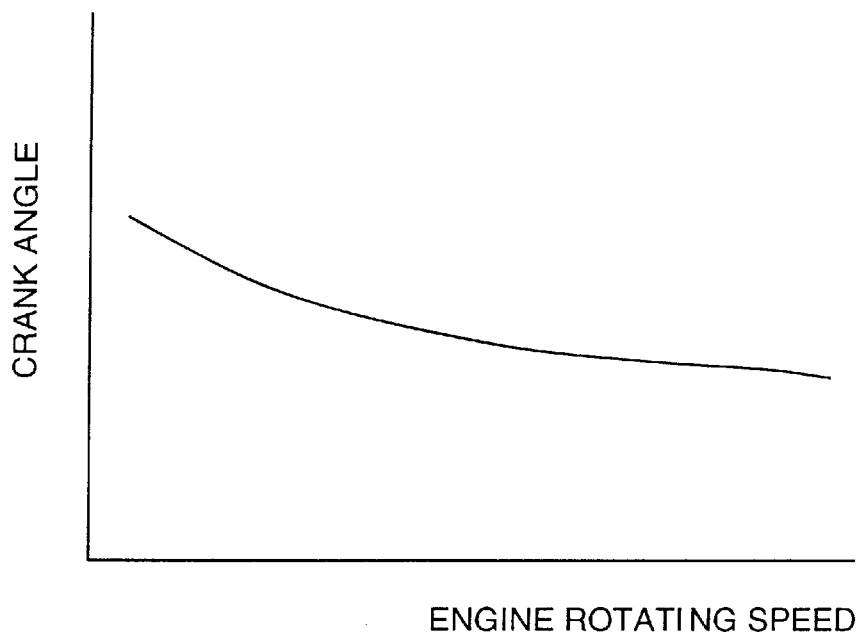
FIG. 13 is a graph showing the relationship between engine rotating speed and crank angle which influences injected fuel to be transported to a desired position.

Therefore, an embodiment of a control method of giving a fuel injection timing corresponding to an ignition timing will be described below, referring to FIG. 14. The control is also executed by calculation processing in the calculating means 100 of the control unit 2. The ignition timing shown is calculated by the control part (not shown) on the promise that there is no requirement of shifting the ignition timing to the lag angle side. Initially, in the block 131, a fuel injection timing is calculated as a basic value on the premise that there is no requirement of shifting the ignition timing to the lag angle side. On the other hand, in the block 132, a retard amount of ignition timing, that is, a required amount of lag angle is calculated from, for example, a required amount of emperature rise of the catalyst. Therein, when the ignition timing is shifted toward the lag angle side due to a lag angle request, the fuel injection timing is shifted toward the lag angle side in relation to an amount of shifting the ignition timing toward the lag angle side corresponding to the engine rotating speed, as described referring to FIG. 12 and FIG. 13. Therefore, a coefficient obtained corresponding to the engine rotating speed is searched in the block 133, and an shifting amount of fuel injection timing is calculated by multiplying the searched coefficient to the amount of shifting the ignition timing toward the lag side. The shifting amount of fuel injection timing is added to the basic value of the fuel injection timing obtained in the block 131 to be output as an injection timing. The coefficient obtained in the block 133 is the gradient of the straight line yy shown in FIG. 7, and the value can be obtained from the relationship between FIG. 12 and FIG. 13.

An example of a method of calculating the requested retard amount obtained in the block 132 of FIG. 14 will be described below, referring to FIG. 15. In the block 141, a basic value of the retard amount determined by an operating condition of the stratified burning is obtained. The basic value is a value capable of retarding determined by combustion performance such as the width of the stable combustion range ww described referring to FIG. 7, and is obtained from the operating condition determined by the engine rotating speed and the torque.

On the other hand, since the required temperature rise of the catalyst can be determined from an engine cooling water, temperature and an engine cooling water temperature at starting operation of the engine, each coefficient in regard to what amount of retard is given to the basic retard value is obtained from each of the block 142 and the block 143. Then, an required amount of retard during warming-up operation of the engine is obtained by multiplying each of the obtained coefficients to the basic retard value.

Figure 16:
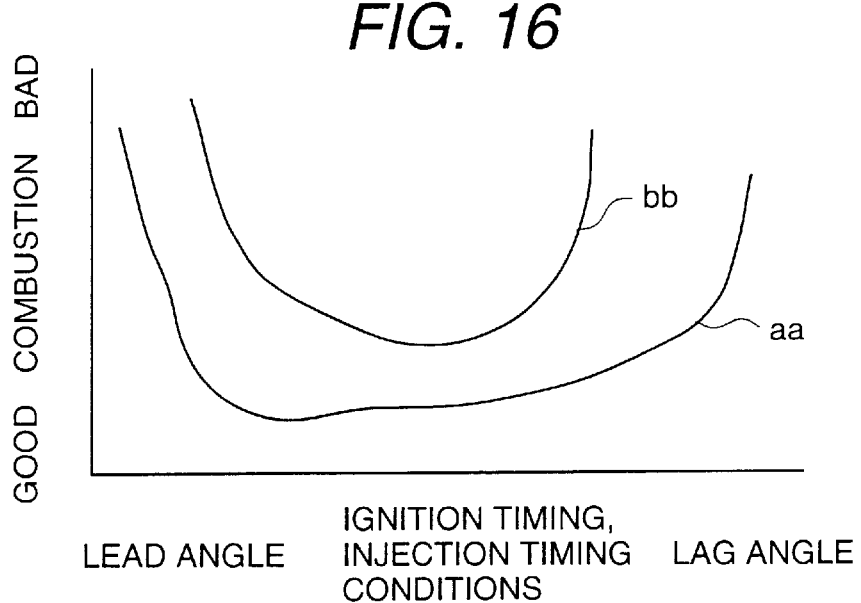
FIG. 16 is a graph showing the relationship between ignition timing, fuel injection timing and presence of swirl generation, combustion stability.

By performing the control described above, the retard amount of ignition timing can be controlled more detail than in the case described by referring to FIG. 11. Further, in a case where a swirl generating mechanism in the combustion chamber in order to hold burning is employed, as shown in FIG. 16, good combustion stability is obtained as indicated by the characteristic line aa in the figure when the swirl generating mechanism is normally operated. However, the combustion stability is deteriorated as indicated by the characteristic line bb in the figure when the swirl generating mechanism is faulty. In such a state, when a failure is detected in the swirl generating mechanism in the embodiment described referring to FIG. 14, such retard control as to not hold burning is not performed and the fuel injection timing can be also set to a value matching with the ignition timing by setting the required retard amount to 0 (zero).

Figure 17:
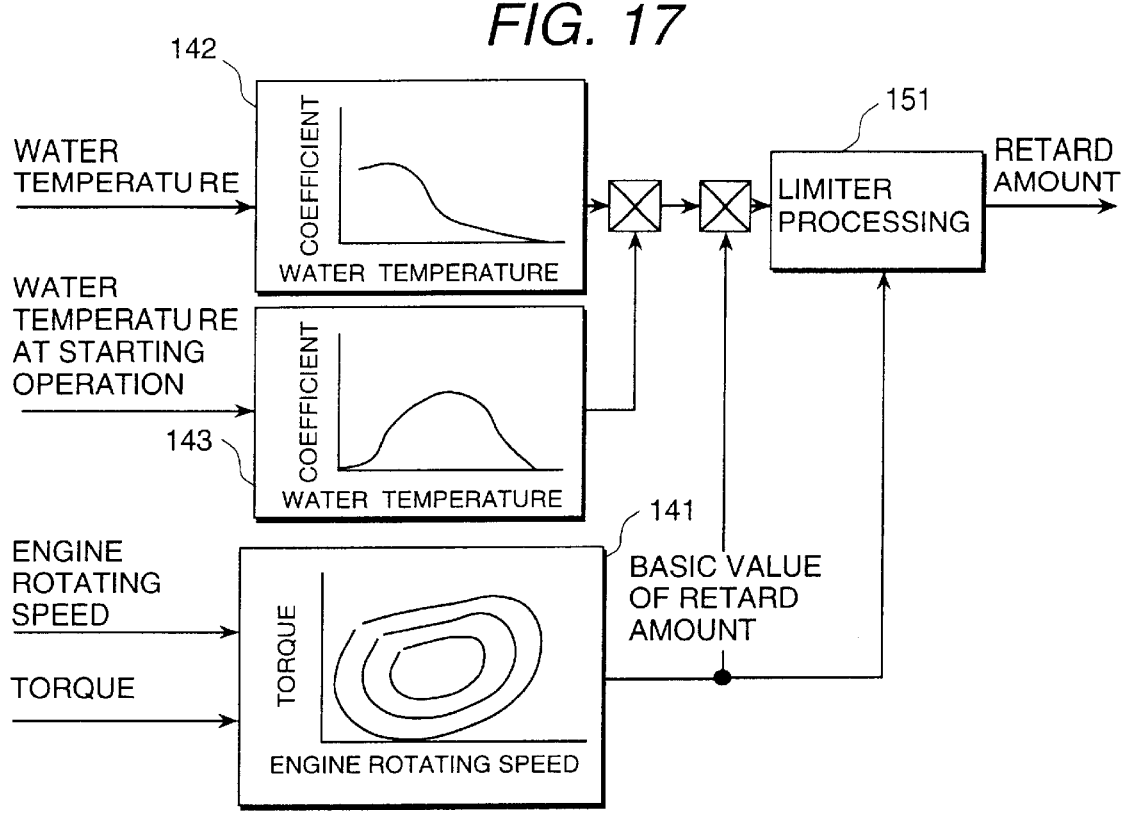
FIG. 17 is a block diagram of another example of a requested retard amount calculation process in the calculation process of fuel injection timing control shown in FIG. 14.

Further, it is can be understood from the characteristic shown in FIG. 8 that good combustion can not be obtained when the ignition timing is excessively shifted toward the lag angle side. Accordingly, the object of shifting the ignition timing toward the lag angle side can not attained because not only the output of the engine becomes unstable, but also the exhaust gas temperature becomes low. On the other hand, when a retard amount larger than the value of the basic retard amount is calculated in the required retard amount calculation processing described referring to FIG. 15, the phenomenon described above occurs. In order to avoid this phenomenon, it is effective to add a limiter processing 151 to the calculation processing shown in FIG. 15, as shown in FIG. 17. That is, by adding the limiter processing block 151 for performing limiting processing so that the calculated retard amount does not exceed the basic value of retard amount, the above-mentioned phenomenon due to an excessively shifted angle does not occur. The processing is also executed by the calculation means 100 of the control unit 2.

Figure 18:
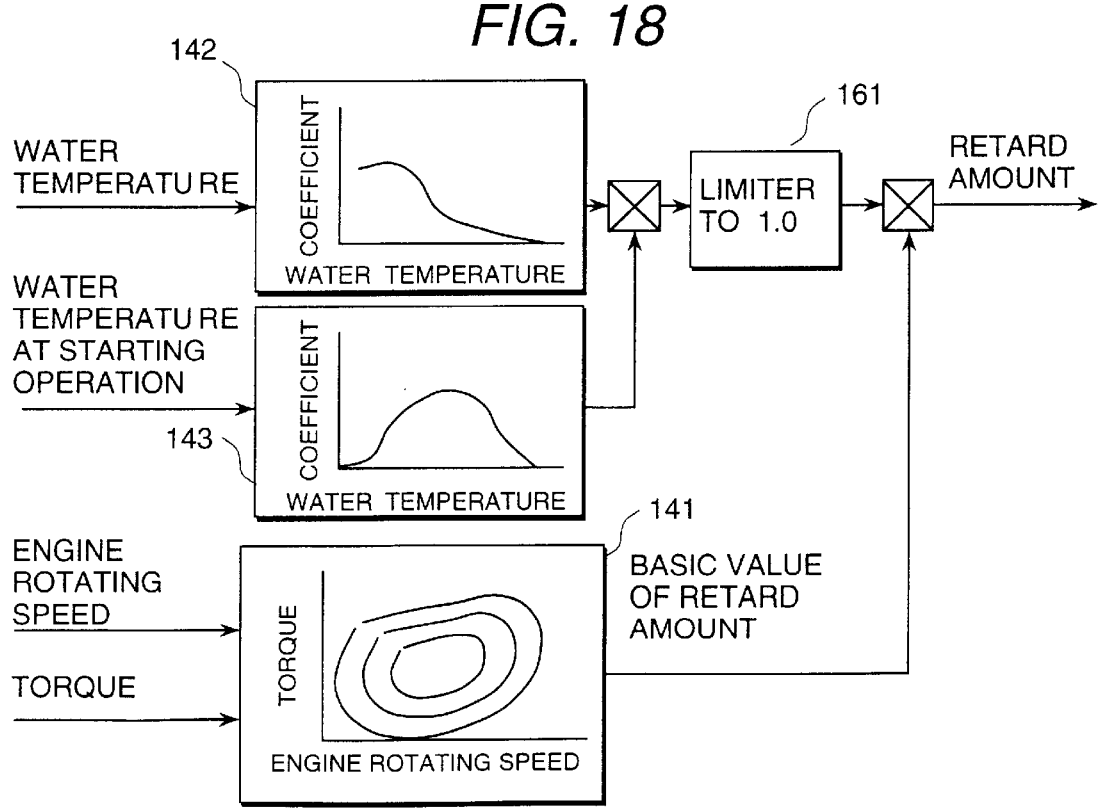
FIG. 18 is a block diagram of a further embodiment of a requested retard amount calculation process in the calculation process of fuel injection timing control shown in FIG. 14.

FIG. 18 shows a further embodiment having the limiting function similar to the embodiment shown in FIG. 17. This embodiment is added with the block 151 for performing limiting processing for limiting a coefficient multiplied to the basic retard amount to 1.0. The processing is also executed by the calculation means 100 of the control unit 2.

Figure 19:
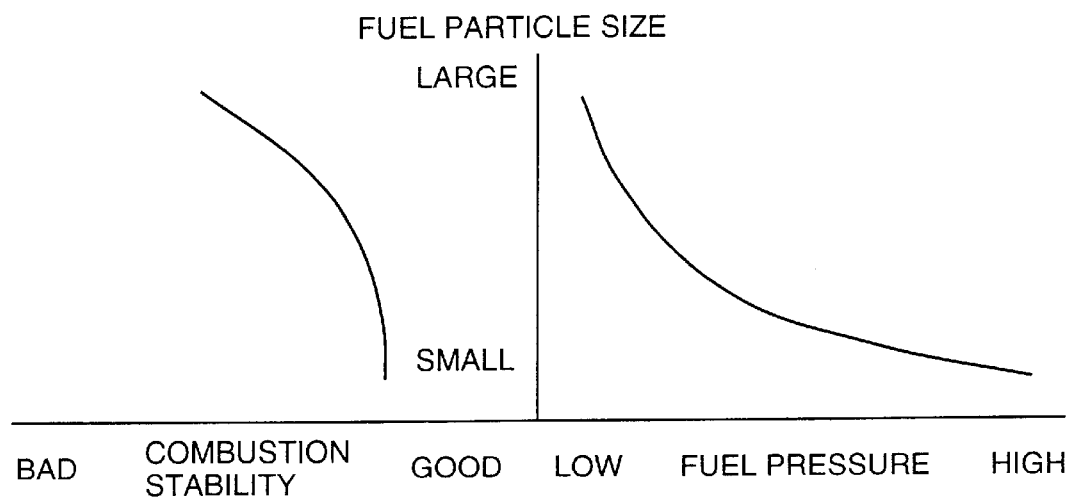
FIG. 19 is a graph showing an example of the relationships between fuel pressure and fuel particle size injected from an injector and between combustion stability and the fuel particle size.

There is some cases where the regulator 14 for maintaining a fuel supply pressure to the injector 13 in a desired value has a function capable of adjusting (changing) the fuel pressure. Particle size of the fuel injected from the injector 13 is changed according to the fuel pressure. FIG. 19 shows an example of the relationships between fuel pressure and fuel particle size injected from the injector 13 and between combustion stability and the fuel particle size. When the fuel pressure is high, the particle size of the fuel injected a from the injector 13 becomes small, and accordingly the combustion stability becomes better. However, a large amount of energy is necessary in order to obtain a high fuel pressure. Accordingly, by adjusting the fuel pressure corresponding to the operating condition, the amount of energy consumption in order to increase the fuel pressure and the combustion stability can be compatible with each other in good balance.

Figure 14:
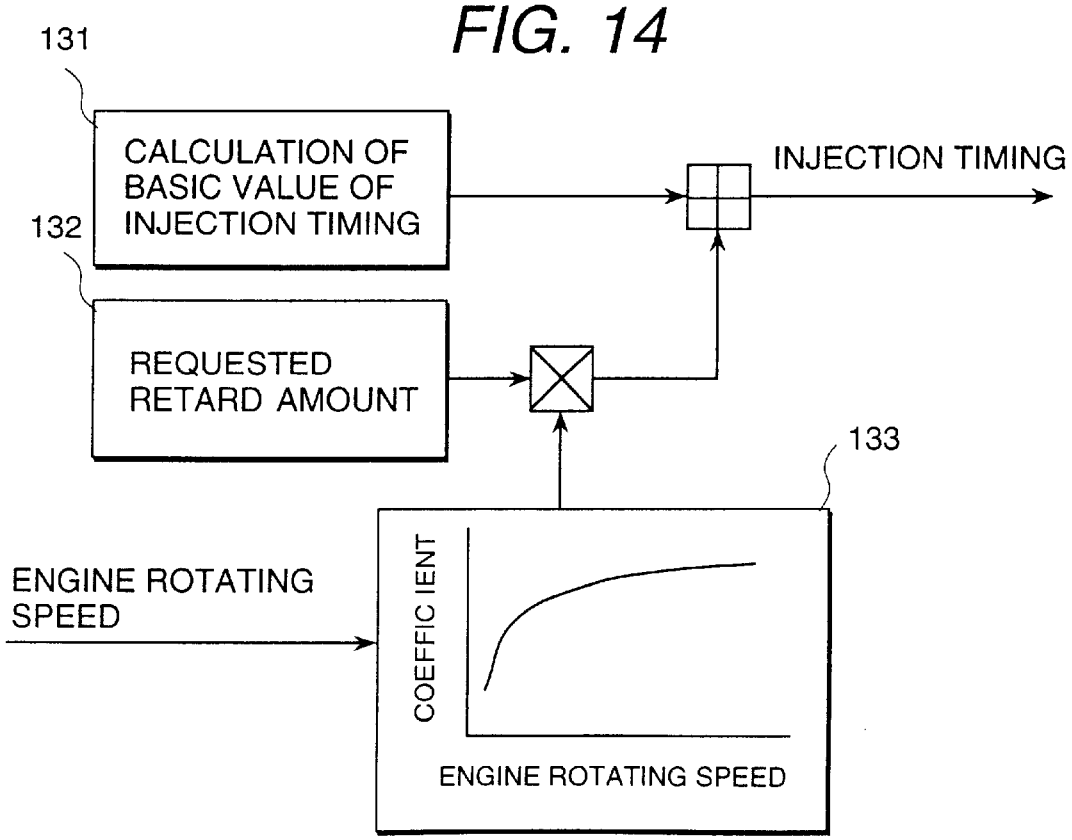
FIG. 14 is a block diagram of another embodiment of a calculation process of fuel injection timing control which is executed by a calculating means of the control unit in the in-cylinder injection type engine system shown in FIG. 1.
Figure 15:
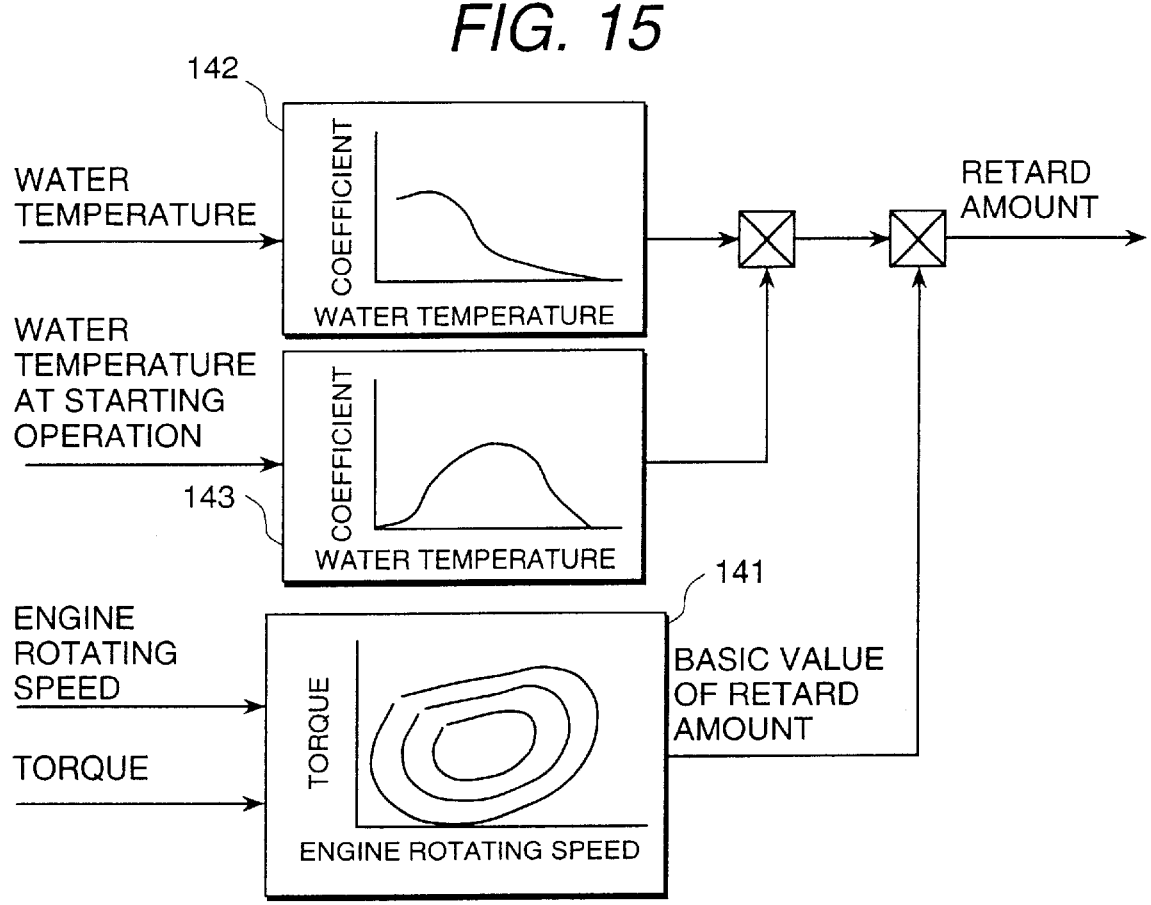
FIG. 15 is a block diagram of an example of a requested retard amount calculation process in the calculation process of fuel injection timing control shown in FIG. 14.
Figure 20:
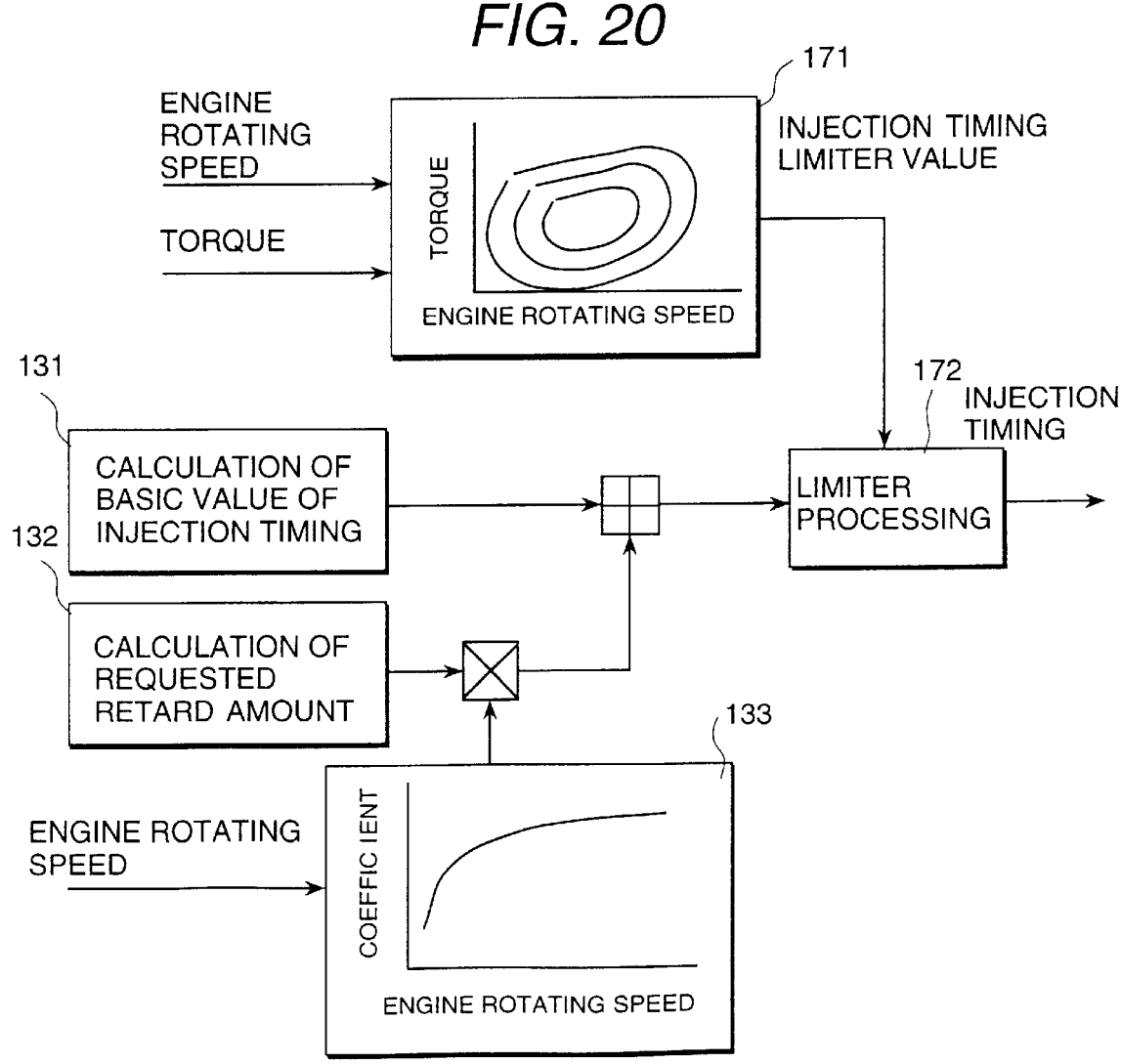
FIG. 20 is a block diagram of another example of calculation processes of ignition timing control and fuel injection timing control which are executed by a calculating means of the control unit in the in-cylinder injection type engine system shown in FIG. 1.

Since the calculation of the fuel injection timing is performed by calculating the coefficient in the example described referring to FIG. 14, it is preferable that a limiter is provided from the same reason. An example will be described below, referring to FIG. 20. This example is formed by adding the blocks 171 and 172 to the example described referring to FIG. 14. The blocks 171 and 172 are also executed by the calculation means 100 of the control unit 2. A limiting value of the fuel injection timing obtained from the engine rotating speed and the torque is calculated in the block 171, and the limitation is finally added to the fuel injection timing in the block 172. By doing so, it is possible to prevent fuel injection at such a fuel injection timing that stable combustion can not be held.

Figure 21:
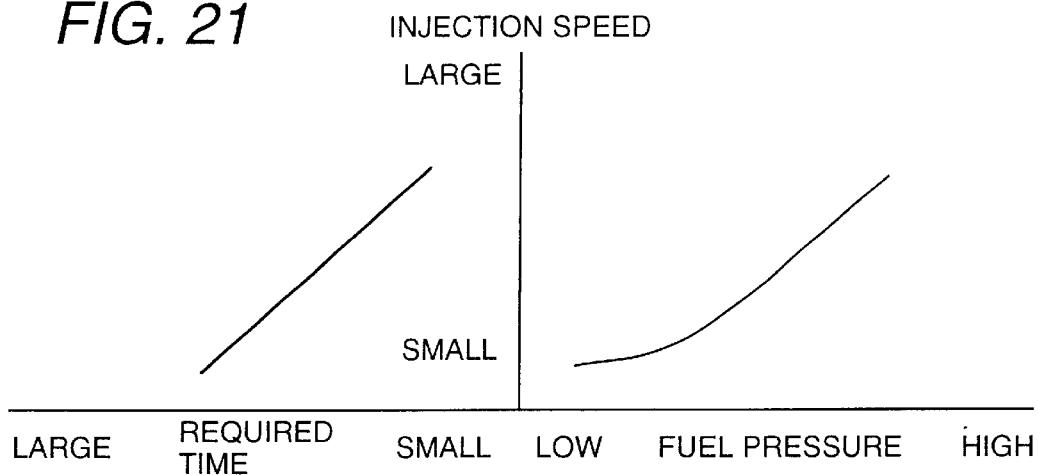
FIG. 21 is a graph showing the relationships between fuel pressure and injection (spray) speed and between time required injected fuel reaching a desired position and the injection speed.

Here, the relationship between the fuel pressure and the speed of fuel injection (spray) and the required time from the state of FIG. 6(A) to the state of (B) will be described, referring to FIG. 21. The speed of fuel injection becomes faster as the fuel pressure is higher, and accordingly the required time becomes shorter. This phenomenon means that the relationship described referring to FIG. 12 is different depending on the fuel pressure. Therefore, in a system having a means for adjusting the fuel pressure, it is preferable to calculate the fuel injection timing through the control method shown in FIG. 22.

Figure 22:
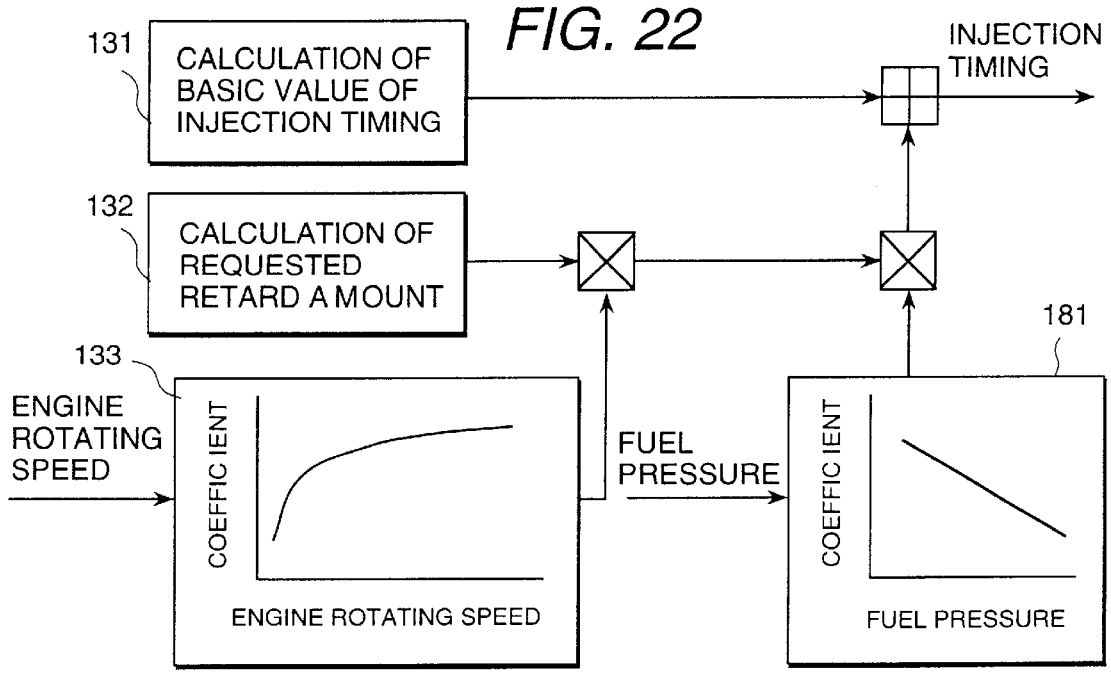
FIG. 22 is a block diagram of a further example of a calculation process of fuel injection timing control which is executed by a calculating means of the control unit in the in-cylinder injection type engine system shown in FIG. 1.

Comparing to the control method described referring to FIG. 14, in this fuel injection timing control method shown in FIG. 22, the calculation of a coefficient using the fuel pressure and reflection of the calculated coefficient to the fuel injection timing calculation by multiplying are varied by adding the block 181. Thereby, an appropriate fuel injection timing corresponding to change in the ignition timing can be calculated even if the fuel injecting speed is changed by adjusting the fuel pressure. The calculation processing in the block 181 is also executed by the calculation means 100 of the control unit 2.

In the stratified burning with fuel injection during the compression stroke, heat outflow to the exhaust gas is small due to reduction of the pumping loss and the amount of heat generated by combustion is decreased though the amount of exhaust gas is increased by setting the air-fuel ratio to a lean state. Therefore, temperature of the exhaust gas becomes low compared to that in the case of performing combustion under a rich air-fuel ratio.

Figure 23:
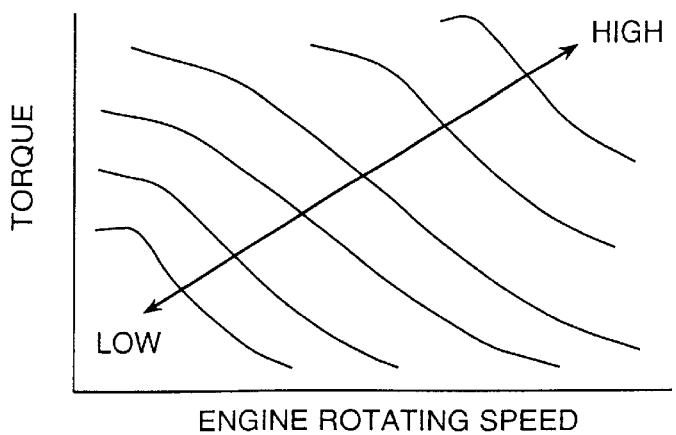
FIG. 23 is a graph showing an example of exhaust gas temperature under various conditions of engine rotating speed and torque.

FIG. 23 shows an example of exhaust gas temperature under various conditions of engine rotating speed and torque. The temperature of the exhaust gas is low under conditions of low engine rotating speed and low torque. Therefore, when the stratified burning is continued under the conditions of low engine rotating speed and low torque such as idling state, temperature of the catalyst is decreased though the engine cooling water temperature is high.

Therefore, in such a case, it is preferable that the temperature of the catalyst is maintained by shifting the ignition timing toward the lag angle side in order to maintain the active state of the catalyst. However, in the control obtaining the retard amount using the engine cooling water temperature as described referring to FIG. 18, it is impossible to shift the ignition timing toward the lag angle side because the engine cooling water temperature does not become low in such a state.

Figure 24:
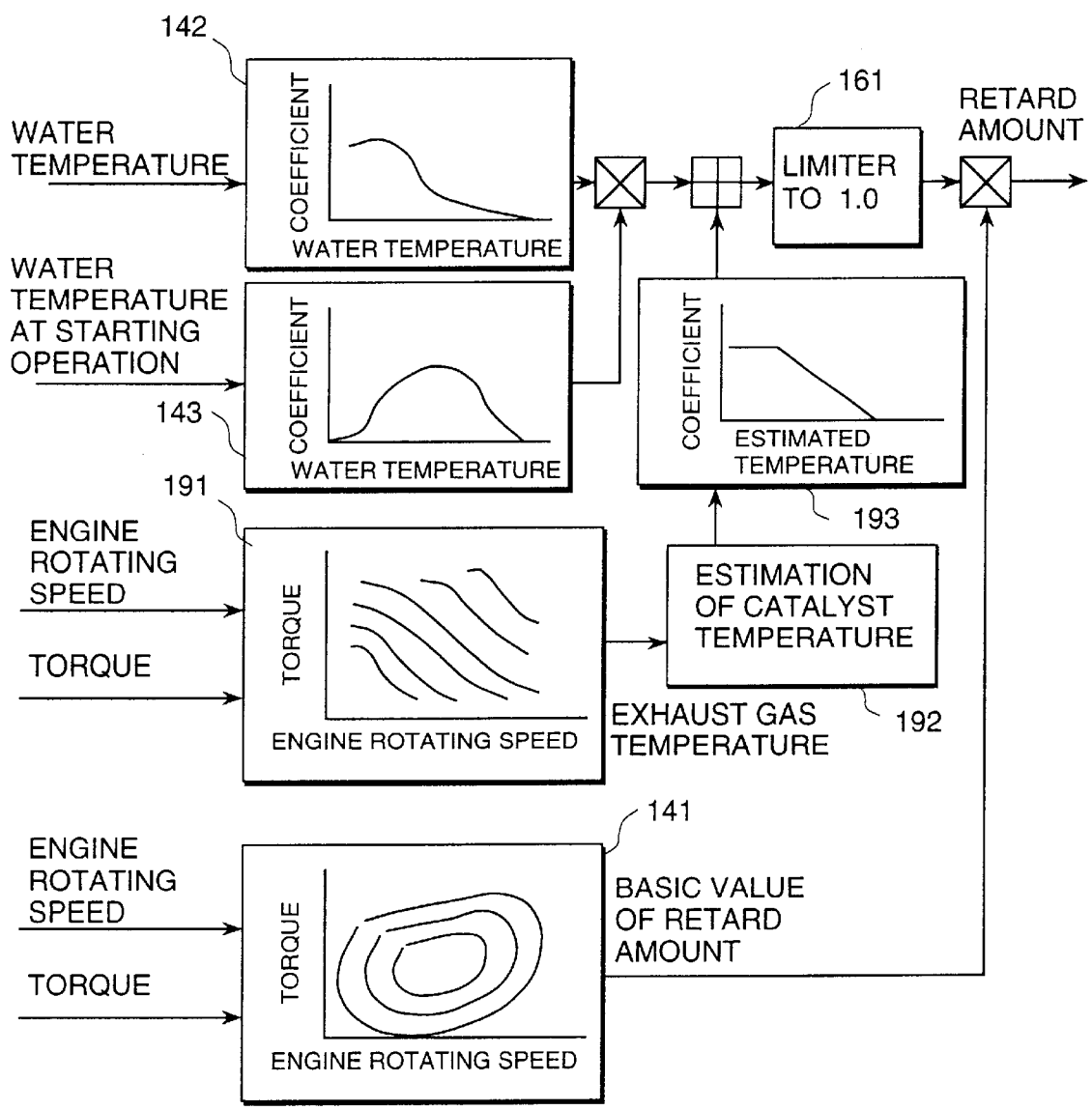
FIG. 24 is a block diagram of a still further example of a requested retard amount calculation process in the calculation process of fuel injection timing control shown in FIG. 14.

Therefore, as shown in FIG. 24, by applying the retard required amount calculation method for sifting the ignition timing toward the lag angle side when the temperature of the catalyst is decreased, the temperature of the catalyst can be maintained in a good active state.

Referring to FIG. 24, the blocks 141 to 143 and the block 161 are function means equivalent to the example referring to FIG. 18. The block 191 calculates an exhaust gas temperature from the operating condition of the engine. The block 192 estimates the temperature of the catalyst from the exhaust gas temperature, an elapsing time of the operating condition and so on. The block 193 obtains by searching a ratio of shifting the ignition timing toward the lag angle side from the estimated catalyst temperature and adds the obtained coefficient to a coefficient to be multiplied to the basic value of retard amount. The calculation processing in each of these blocks 191 to 193 is also executed by the calculation means 100 of the control unit 2.

Although the temperatures of the exhaust gas and the catalyst are estimated in this example, the temperature information may be directly acquired by the method of directly measuring these temperatures using temperature sensors.

Further, although description has been made on the example of performing the control of shifting the ignition timing toward the lag angle side for controlling the temperature of the catalyst, the present invention can be applied to various requirements of shifting the ignition timing toward the lag angle side such as noise reduction of the engine, output torque control, knocking avoid control and so on.

Furthermore, although the description has been made on the case where the ignition timing is shifted toward the lag angle side, the present invention can be applied to a requirement of shifting the ignition timing toward the lead angle side by shifting the conditions on the straight line yy in FIG. 7, which is the same in realization of the requirement of shifting toward the lag angle side and, the operation principle from the viewpoint of capability of obtaining good combustion.

While the embodiments of the engine control system in accordance with the present invention have been described in detail, it is understood that the present invention is not limited by these embodiments and that various changes and modifications may be made in designs without departing from the spirit of the present invention described in the claims.

In control system for an in-cylinder injection type engine performing fuel injection and ignition during the compression stroke, the control system for in-cylinder injection type engine in accordance with the present invention can change the ignition timing and the fuel injection timing while the stable combustion state is being maintained.

What is claimed is:

1. A control system for an in-cylinder injection type engine comprising:

means for injecting fuel into a cylinder of the engine in a compression stroke;

means for igniting the fuel in the compression stroke;

means for determining fuel injection timing and ignition timing from conditions of a rotating speed and a load of said engine;

means for modifying ignition timing from conditions other than said conditions of the rotating speed and the load of said engine; and means for modifying fuel injection timing, wherein
      said means for modifying fuel injection timing modifies said fuel injection timing corresponding to the rotating speed of said engine so as to adapt to change of behavior inside a combustion chamber caused by the modification of the ignition timing.

2. A control system for an in-cylinder injection type engine according to claim 1, wherein the modified value of fuel injection timing is calculated based on the modified value of ignition timing and the rotating speed of the engine.

3. A control system for an in-cylinder injection type engine according to claim 1, wherein said modified value of fuel injection timing is calculated based on said modified value of ignition timing and the rotating speed of the engine and a fuel supply pressure.

4. A control system for an in-cylinder injection type engine according to claim 1, wherein said means for modifying ignition timing has an allowable limit value for an amount to be changed.

5. A control system for an in-cylinder injection type engine according to claim 1, wherein said means for modifying fuel injection timing has an allowable limit value for an amount to be changed.

* * * * *